United States Patent
Cho et al.

(10) Patent No.: US 9,330,673 B2
(45) Date of Patent: May 3, 2016

(54) METHOD AND APPARATUS FOR PERFORMING MICROPHONE BEAMFORMING

(75) Inventors: Sung-Jae Cho, Seoul (KR); Hyun-Soo Kim, Hwaseong-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 853 days.

(21) Appl. No.: 13/231,705

(22) Filed: Sep. 13, 2011

(65) Prior Publication Data

US 2012/0065973 A1     Mar. 15, 2012

(30) Foreign Application Priority Data

Sep. 13, 2010 (KR) .......................... 10-2010-0089469

(51) Int. Cl.

| | | |
|---|---|---|
| G10L 17/00 | (2013.01) | |
| G10L 21/00 | (2013.01) | |
| H04R 1/40 | (2006.01) | |
| H04R 29/00 | (2006.01) | |
| G06K 9/00 | (2006.01) | |
| G10L 15/25 | (2013.01) | |
| G10L 21/0216 | (2013.01) | |

(52) U.S. Cl.
CPC ............... *G10L 21/00* (2013.01); *H04R 1/406* (2013.01); *H04R 29/005* (2013.01); *G06K 9/00335* (2013.01); *G10L 15/25* (2013.01); *G10L 17/00* (2013.01); *G10L 2021/02166* (2013.01); *H04R 2430/20* (2013.01)

(58) Field of Classification Search
CPC ....................... G06K 9/00335; G06K 9/00221
See application file for complete search history.

(56) References Cited

U.S. PATENT DOCUMENTS

| | | | |
|---|---|---|---|
| 5,581,620 A | 12/1996 | Brandstein et al. | |
| 6,005,610 A * | 12/1999 | Pingali | 348/169 |
| 6,219,640 B1 * | 4/2001 | Basu | G06K 9/00221 704/231 |
| 6,243,683 B1 | 6/2001 | Peters | |
| 6,449,593 B1 * | 9/2002 | Valve | 704/233 |
| 6,516,066 B2 * | 2/2003 | Hayashi | 381/92 |
| 6,707,489 B1 * | 3/2004 | Maeng et al. | 348/211.12 |
| 6,850,265 B1 * | 2/2005 | Strubbe et al. | 348/14.05 |
| 7,599,527 B2 * | 10/2009 | Shah et al. | 382/118 |
| 2002/0101505 A1 * | 8/2002 | Gutta et al. | 348/14.07 |
| 2002/0140804 A1 * | 10/2002 | Colmenarez et al. | 348/14.08 |
| 2003/0154084 A1 * | 8/2003 | Li | G06K 9/00228 704/273 |

(Continued)

FOREIGN PATENT DOCUMENTS

| | | |
|---|---|---|
| CN | 101394479 A | 3/2009 |
| CN | 101715102 A | 5/2010 |

(Continued)

OTHER PUBLICATIONS

Feraud et al. "LISTEN: A System for Locating and Tracking Individual Speakers", Proceedings of the Second International Conference on Automatic Face and Gesture Recognition, 1996.*

(Continued)

*Primary Examiner* — Jialong He (57) ABSTRACT

A method and apparatus for performing microphone beamforming. The method includes recognizing a speech of a speaker, searching for a previously stored image associated with the speaker, searching for the speaker through a camera based on the image, recognizing a position of the speaker, and performing microphone beamforming according to the position of the speaker.

20 Claims, 6 Drawing Sheets

(56) References Cited

U.S. PATENT DOCUMENTS

| | | | |
|---|---|---|---|
| 2004/0037436 A1* | 2/2004 | Rui | 381/92 |
| 2006/0075422 A1* | 4/2006 | Choi et al. | 725/18 |
| 2007/0030984 A1* | 2/2007 | Gotfried | 381/122 |
| 2007/0038444 A1* | 2/2007 | Buck et al. | 704/235 |
| 2008/0218582 A1* | 9/2008 | Buckler | 348/14.08 |
| 2008/0285771 A1* | 11/2008 | Tanaka et al. | 381/92 |
| 2009/0002477 A1* | 1/2009 | Cutler | 348/14.1 |
| 2009/0018828 A1* | 1/2009 | Nakadai et al. | 704/234 |
| 2009/0052688 A1* | 2/2009 | Ishibashi et al. | 381/92 |
| 2009/0109297 A1 | 4/2009 | Nakagawa et al. | |
| 2009/0234842 A1* | 9/2009 | Luo et al. | 707/5 |
| 2010/0020951 A1* | 1/2010 | Basart et al. | 379/142.01 |
| 2010/0026780 A1* | 2/2010 | Tico et al. | 348/14.02 |
| 2010/0085415 A1 | 4/2010 | Rahman | |
| 2010/0128892 A1* | 5/2010 | Chen et al. | 381/92 |
| 2010/0142781 A1* | 6/2010 | Walker et al. | 382/131 |
| 2011/0019835 A1* | 1/2011 | Schmidt et al. | 381/71.11 |
| 2011/0082690 A1* | 4/2011 | Togami et al. | 704/201 |
| 2011/0164141 A1* | 7/2011 | Tico et al. | 348/207.99 |
| 2011/0243397 A1* | 10/2011 | Watkins et al. | 382/118 |
| 2011/0285807 A1* | 11/2011 | Feng | G06K 9/00228 348/14.08 |
| 2011/0285808 A1* | 11/2011 | Feng et al. | 348/14.09 |
| 2012/0078624 A1 | 3/2012 | Yook et al. | |

FOREIGN PATENT DOCUMENTS

| | | |
|---|---|---|
| JP | 2001-067098 | 3/2001 |
| KR | 10-0827080 | 4/2008 |
| KR | 10-2009-0007882 | 1/2009 |
| KR | 10-0922963 | 10/2009 |
| WO | WO 2010/014074 A1 | 2/2010 |
| WO | WO 2010/098546 A2 | 9/2010 |

OTHER PUBLICATIONS

Donovan et al. "Microphone Arrays as Generalized Cameras for Integrated Audio Visual Processing", IEEE Conference on Computer Vision and Pattern Recognition, 2007.*

International Search Report dated May 1, 2012 in connection with International Application No. PCT/KR2011/006692.

Written Opinion of the International Searching Authority dated May 1, 2012 in connection with International Application No. PCT/KR2011/006692.

Extended European Search Report dated Oct. 9, 2013 in connection with European Patent Appplication No. 11180609.7, 9 pages.

K. Hidai, et al., "Robust Face Detection Against Brightness Fluctuation and Size Variation", Proceedings 2000 IEEE/RSJ International Conference on Intelligent Robots and Systems (IROS 2000), vol. 2, Oct. 31, 2000, pp. 1379-1384.

Translated Chinese Office Action dated Feb. 16, 2015 in connection with Chinese Patent Appplication No. 2011800439884, 13 pages.

* cited by examiner

METHOD AND APPARATUS FOR PERFORMING MICROPHONE BEAMFORMING

CROSS-REFERENCE TO RELATED APPLICATION(S) AND CLAIM OF PRIORITY

The present application is related to and claims the benefit of Korean Patent Application No. 10-2010-0089469, filed on Sep. 13, 2010, in the Korean Intellectual Property Office, the disclosure of which is incorporated herein in its entirety by reference.

TECHNICAL FIELD OF THE INVENTION

The present invention relates to a method and apparatus for performing microphone beamforming, and more particularly, to a method and apparatus for performing microphone beamforming which adaptively changes a direction of beamforming according to a speaker's position.

BACKGROUND OF THE INVENTION

In information and communications technology, speech recognition has developed remarkably. In order to accurately recognize a speaker's speech, a technology for distinguishing the speaker's speech from ambient noise and removing the noise is necessary.

However, since the speaker continuously moves, it is difficult to accurately distinguish the speaker's speech from noise.

SUMMARY OF THE INVENTION

To address the above-discussed deficiencies of the prior art, it is a primary object to provide a method and apparatus for adaptively performing microphone beamforming.

According to an aspect of the present invention, there is provided a method of performing microphone beamforming. The method includes recognizing a speech of a speaker, and searching for a previously stored image associated with the speaker. The method also includes searching for the speaker through a camera based on the image, and recognizing a position of the speaker. The method further includes performing microphone beamforming according to the position of the speaker.

The recognizing of the speech of the speaker may include receiving a speech signal from the speaker, extracting a section including a predetermined speech signal from the speech signal, and identifying the speaker based on the section.

The identifying of the speaker may include identifying the speaker by comparing the predetermined speech signal with speech signals that are previously acquired from one or more speakers and stored.

The searching of the speaker may include extracting an object corresponding to the speaker from image data acquired through the camera by comparing the image data acquired through the camera with previously stored image data associated with one or more speakers.

The recognizing of the position may include determining whether the position of the speaker is changed to a changed position based on information about the object, wherein the performing of the microphone beamforming includes adaptively performing the microphone beamforming according to the changed position if the position of the speaker is changed to the changed position.

The performing of the microphone beamforming may include amplifying a speech generated in an area, from among a plurality of areas, where the speaker is located, and decreasing speeches generated in other areas.

According to another aspect of the present invention, there is provided an apparatus for performing microphone beamforming. The apparatus includes a speech recognizing unit configured to recognize a speech of a speaker. The apparatus also includes an image searching unit configured to search for a previously stored image associated with the speaker. The apparatus further includes a speaker searching unit configured to search for the speaker through a camera based on the image. The apparatus still further includes a position recognizing unit configured to recognize a position of the speaker. The apparatus also includes a beamforming performing unit configured to perform microphone beamforming according to the position of the speaker.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
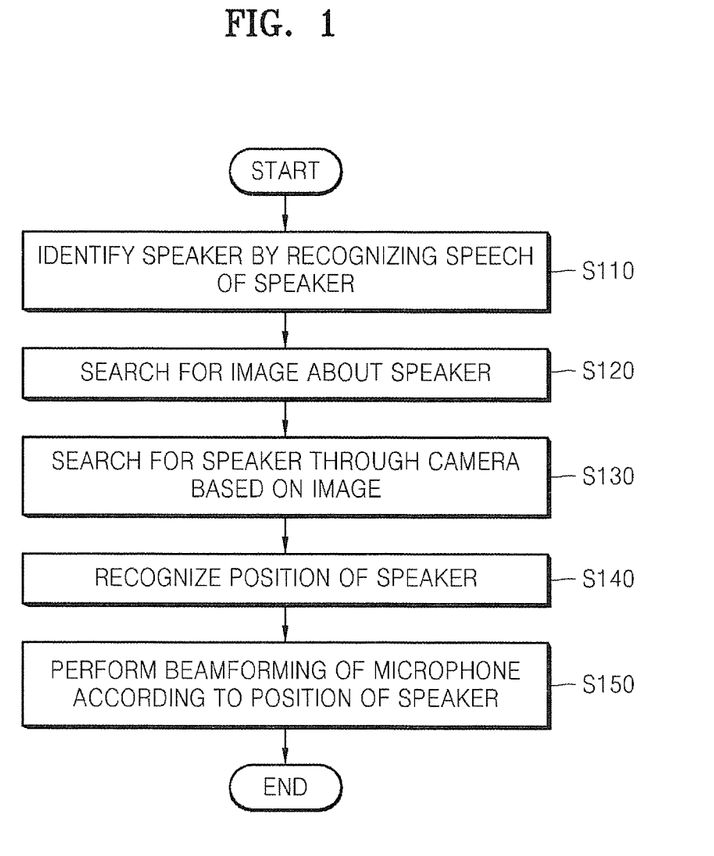
FIG. 1 is a flowchart illustrating a method of performing microphone beamforming, according to an embodiment of the present invention.

FIG. 1 is a flowchart illustrating a method of performing microphone beamforming, according to an embodiment of the present invention.

In operation S110, a speaker is identified by recognizing a speech of the speaker.

Specific information about speeches of one or more speakers may be stored in a database. For example, an average frequency, a tone, an average bandwidth, and so forth, related to each of speeches of one or more speakers may be stored. In an embodiment, words previously defined by one or more speakers (for example, commands to change to a speech recognition mode) may be stored as a speech signal or information about a speech signal. In operation S110, the speaker is identified by extracting a predetermined section (for example, a section including a predefined command) from a speech signal input from the speaker, and comparing a speech signal of the section with a speech signal according to each speaker which is stored in the database.

Operation S110 will be explained in detail with reference to FIG. 2.

In operation S120, an image associated with the speaker whose speech is recognized is searched for.

Image data associated with one or more speakers may be stored in the database. In operation S120, the database in which image data according to each speaker is stored is searched based on information associated with the speaker who is identified in operation S110. The image data according to each speaker may be stored in an internal database of a client or in a predetermined server. In the latter situation, a database stored in the server may be searched by using a search engine.

In operation S130, the speaker is searched for through a camera based on the image that is searched for. An object corresponding to the speaker may be searched for in image data acquired through the camera by comparing the image data acquired through the camera with the image data searched for in operation S120.

In operation S140, a position of the speaker is recognized.

There may be various methods of recognizing the position of the speaker through the camera. Although three methods of recognizing the position of the speaker will be explained below, the present embodiment is not limited thereto.

In a first method, the position of the speaker is confirmed in image data acquired through the camera by comparing the image data acquired through the camera with the image data associated with the speaker searched for in operation S120. It is difficult to accurately detect the position of the speaker by using one image data. However, even when only one image data is used, since an angle of deviation of the speaker from a reference axis (e.g., an axis passing through the center of a microphone array) in a horizontal or vertical direction may be calculated, the angle is acquired as position information.

In a second method, the position of the speaker is confirmed in a plurality of pieces of image data by comparing the image data associated with the speaker searched for in operation S120 with a plurality of pieces of image data captured at different angles by using one or more cameras. When the same object is simultaneously photographed at different angles, distances between the object and the cameras may be calculated. Accordingly, in the second method, an angle of deviation of the speaker from a reference point (for example, a microphone located in the middle among a plurality of microphones) in a horizontal or vertical direction and a distance from the reference point may be acquired as position information.

In a third method, first information associated with the position of the speaker is acquired from a speech signal of the speaker received through a microphone array, and second information associated with the position of the speaker is acquired by comparing the image data associated with the speaker searched for in operation S120 with a plurality of pieces of image data captured at different angles by using one or more cameras. The position of the speaker is determined by combining the first information and the second information.

If a microphone array is used, microphones may differently recognize one speech signal generated from the same source. This is because i) a gain of a speech signal varies according to an angle at which the speech signal is incident on each microphone, and ii) a point in time at which the speech signal is input varies according to a distance between the speech signal and each microphone. Accordingly, the first information about the position of the speaker may be acquired by comparing the gain of the speech signal received at each microphone and the point in time at which the speech signal is received.

In operation S150, microphone beamforming is performed according to the position of the speaker. A beamforming technology involves selecting a direction in which a speech signal is to be received by using a plurality of microphones, receiving only a speech signal received in the selected direction, and excluding speech signals received in other directions. When the beamforming technology is applied to the present invention, only a desired speech may be selectively received by dividing an area where a speech may be recognizable into a plurality of areas, and amplifying a speech generated in an area where the speaker is located and decreasing speeches generated in other areas.

Figure 2:
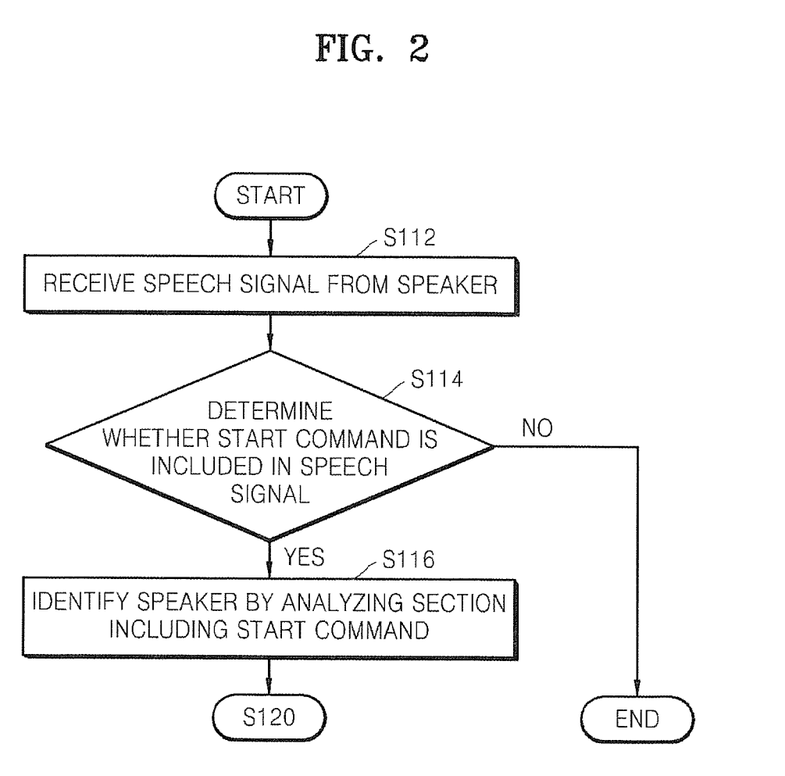
FIG. 2 is a flowchart illustrating an operation of identifying a speaker by recognizing a speech of the speaker in the method of FIG. 1.

FIG. 2 is a flowchart illustrating operation S110 of the method of FIG. 1.

In operation S112, a speech signal is received from the speaker.

In operation S114, it is determined whether a predetermined speech signal is included in the speech signal and the predetermined speech signal is extracted. The predetermined speech signal, which is a predetermined speech signal previously defined by the speaker, may include a start command to start speech recognition in an apparatus for performing microphone beamforming. For example, if it is predetermined that if the speaker speaks out 'puppy', the apparatus changes to a speech recognition mode (in which microphone beamforming is performed and then a speech of a speaker is recognized), a section including a speech signal that is generated by pronouncing 'puppy' is extracted from the speech signal that is received from the speaker. If the predetermined speech signal is not included in the speech signal, the following steps may not be performed and operation S110 may end.

A mode of the apparatus may change to a speech recognition mode by pressing a button attached to the apparatus or pressing a button of a remote controller according to embodiments. In this situation, even if the predetermined speech signal is not included in the speech signal, operation S110 proceeds to operation S116.

In operation S116, the speaker is identified by analyzing the predetermined speech signal extracted in operation S114. Predetermined speech signals acquired from one or more speakers may be stored in the database. In operation S116, the speaker is identified by comparing the predetermined speech signal extracted in operation S114 with the predetermined speech signals stored in the database.

Although a specific signal is extracted from the speech signal received from the speaker and is used to identify the speaker in operation S116, an arbitrary signal may be extracted from the speech signal received from the speaker and may be used to identify the speaker according to embodiments.

Figure 3:
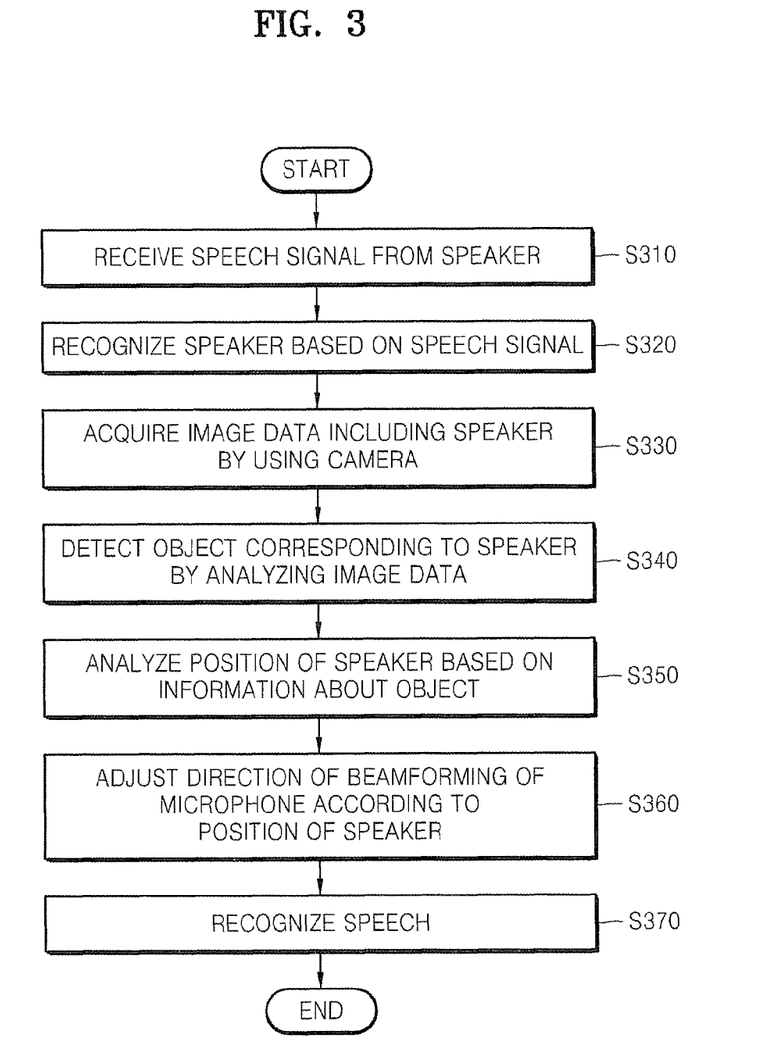
FIG. 3 is a flowchart illustrating a method of performing microphone beamforming, according to another embodiment of the present invention.

FIG. 3 is a flowchart illustrating a method of performing microphone beamforming, according to another embodiment of the present invention.

In operation S310, a speech signal is received from a speaker.

In operation S320, the speaker is recognized based on the speech signal.

In operation S330, image data including the speaker is acquired by using a camera.

In operation S340, an object corresponding to the speaker is detected by analyzing the image data acquired in operation S330.

In operation S350, a position of the speaker is analyzed based on information about the object.

In operation S360, a direction of microphone beamforming is adjusted according to the position of the speaker.

In operation S370, a speech is recognized.

Figure 4A:
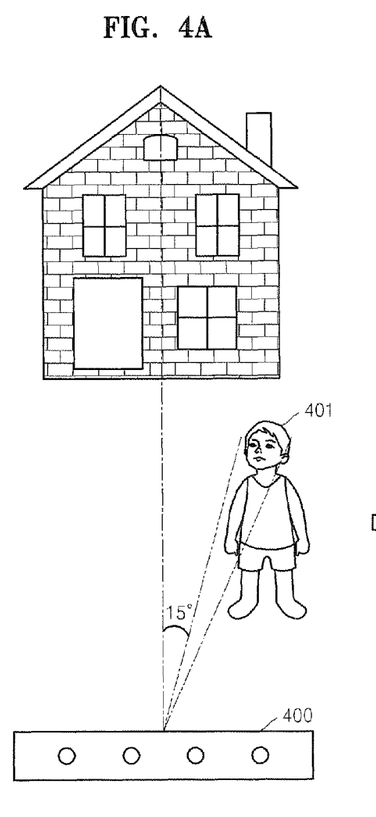
FIGS. 4A and 4B are views for explaining a method of controlling a direction of beamforming according to a position of a speaker, according to an embodiment of the present invention.
Figure 4B:
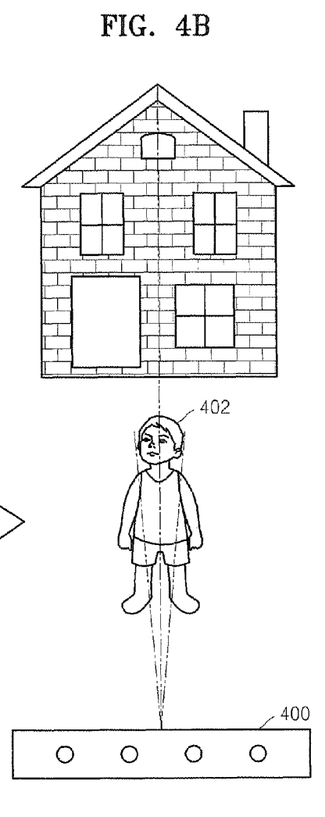

FIGS. 4A and 4B are views for explaining a method of controlling a direction of beamforming according to a position of a speaker, according to an embodiment of the present invention.

A microphone array 400 receives a speech signal from a speaker 401. The microphone array 400 recognizes the speaker 401 by using the speech signal and detects an object corresponding to the speaker from image data acquired through a camera. A position of the speaker 401 may be recognized by using the object.

Referring to FIG. 4A, the speaker 401 is located about fifteen (15) degrees deviated rightward from the center. Accordingly, the microphone array 400 performs beamforming in a direction about fifteen (15) degrees deviated rightward from the center.

While the beamforming is performed, the camera periodically acquires image data including the speaker, and the microphone array 400 detects an object corresponding to the speaker in the image data that is periodically acquired, in order to determine whether a position of the speaker is changed.

As shown in FIG. 4B, if the speaker 402 moves to the center of the microphone array 400, the microphone array 400 changes a direction of beamforming according to the position of the speaker. That is, the microphone array 400 performs beamforming in a direction zero (0) degrees deviated from the center.

Figure 5A:
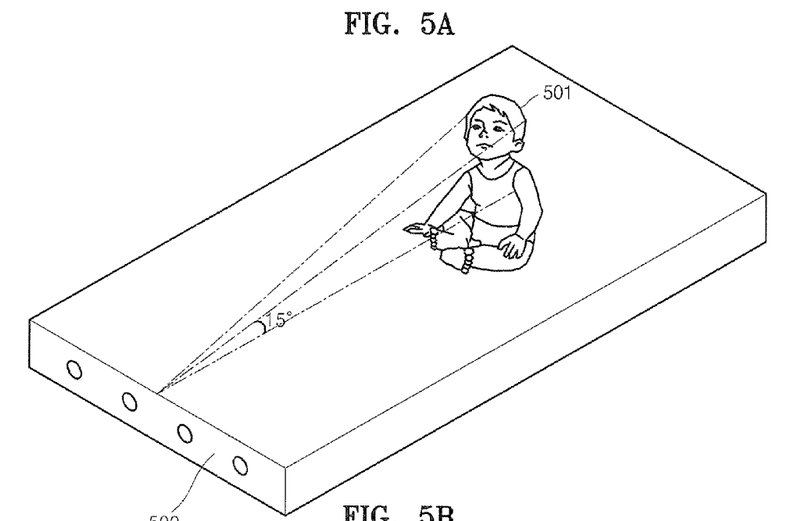
FIGS. 5A and 5B are views for explaining a method of controlling a direction of beamforming according to a position of a speaker, according to another embodiment of the present invention.
Figure 5B:
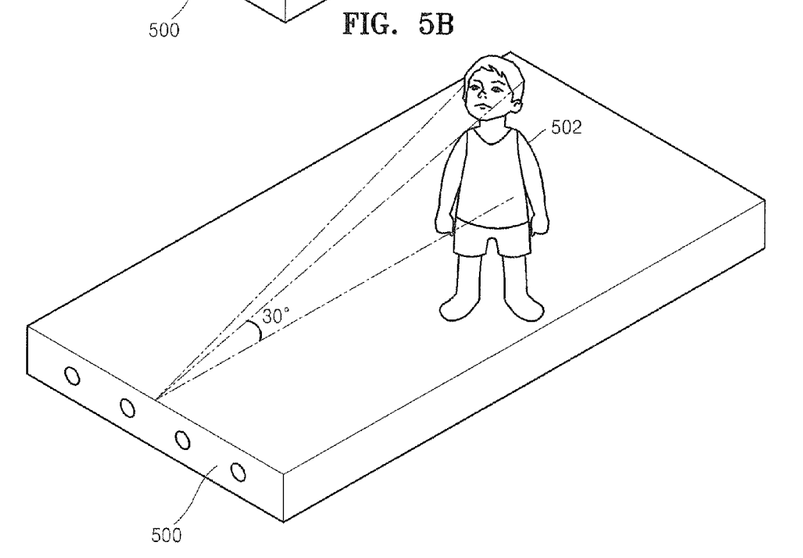

FIGS. 5A and 5B are views for explaining a method of controlling a direction of beamforming according to a position of a speaker, according to another embodiment of the present invention.

A microphone array 500 receives a speech signal from a speaker 501. The microphone array 500 recognizes the speaker 501 by using the speech signal, and detects an object corresponding to the speaker 501 in image data acquired through a camera. A position of the speaker 501 is recognized based on information about the object.

Referring to FIG. 5A, the speaker 501 is located about fifteen (15) degrees deviated upward from the bottom of the center of the microphone array 500. Accordingly, the microphone array 500 performs beamforming in a direction about fifteen (15) degrees deviated upward from the bottom.

While the beamforming is performed, the camera periodically acquires image data including the speaker, and the microphone array 500 detects an object corresponding to the speaker in the image data that is periodically acquired, in order to determine whether a position of the speaker is changed.

As shown in FIG. 5B, if the speaker 502 stands up and moves upward from the bottom, the microphone array 500 changes a direction of beamforming according to a position of the speaker. That is, the microphone array 500 performs beamforming in a direction about thirty (30) degrees deviated upward from the bottom.

In order to change a direction of beamforming vertically from the bottom as shown in FIGS. 5A and 5B, the microphone array 500 includes one or more microphones that are arranged in a horizontal direction and one or more microphones that are arranged in a vertical direction.

Figure 6:
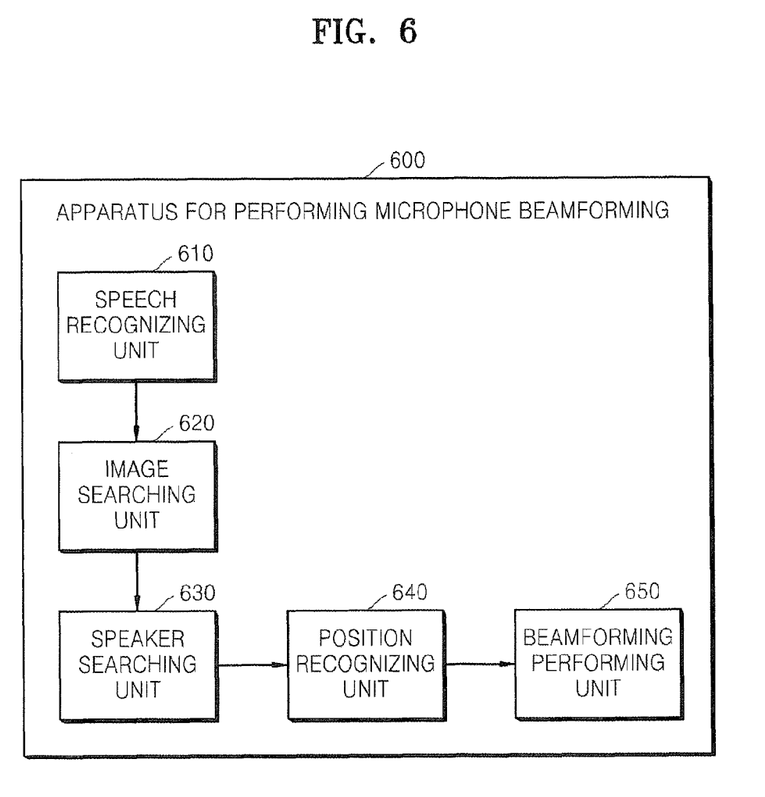
FIG. 6 is a block diagram illustrating an apparatus for performing microphone beamforming, according to an embodiment of the present invention.

FIG. 6 is a block diagram illustrating an apparatus 600 for performing microphone beamforming, according to an embodiment of the present invention.

The apparatus 600 includes a speech recognizing unit 610, an image searching unit 620, a speaker searching unit 630, a position recognizing unit 640, and a beamforming performing unit 650.

The speech recognizing unit 610 recognizes a speech of a speaker. The speech recognizing unit 610 identifies a speaker to which an input speech signal belongs by searching a database in which speech signals related to one or more speakers are stored as described above. The speech recognizing unit 610 may include a speech signal receiving unit (not shown), a speech extracting unit (not shown), and an identifying unit (not shown).

The speech signal receiving unit receives a speech signal from a user. The speech signal receiving unit may be a microphone array including one or more microphones.

The speech extracting unit extracts a section including a predetermined speech signal from the speech signal. The predetermined speech signal may be a speech signal generated by pronouncing a command to start an operation of the beamforming performing unit 650.

The identifying unit identifies the speaker based on the section. The identifying unit identifies the speaker corresponding to the speech signal received from the speech signal receiving unit by comparing a speech signal in the section with a speech signal according to each speaker stored in a database (not shown).

The image searching unit 620 searches for an image about the speaker who is identified. If the apparatus 600 includes the database in which image data associated with one or more speakers is stored, the image searching unit 620 searches for image data associated with the speaker whose speech is recognized in the database. If the apparatus 600 does not include the database, image data associated with the speaker whose speech is recognized may be searched for by using a search engine on a network.

The speaker searching unit 630 searches for the speaker through a camera based on the image data that is searched for. The speaker searching unit 630 detects an object corresponding to the speaker in image data acquired through the camera by comparing the image data acquired through the camera with the image data that is searched for.

The position recognizing unit 640 recognizes a position of the speaker by using information about the object (for example, position information or size information).

The beamforming performing unit 650 performs microphone beamforming according to the position of the speaker. If the position recognizing unit 640 recognizes that the position of the speaker is changed to a different position, the beamforming performing unit 650 changes a direction of beamforming to the changed position. However, if the position recognizing unit 640 recognizes that the position of the speaker is not changed, the beamforming performing unit 650 does not change a direction of beamforming.

The afore-described embodiments of the present invention may be implemented as an executable program, and may be executed by a general-purpose digital computer or other data processing system that runs the program by using a computer-readable recording medium.

Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), and the like.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of performing microphone beamforming, the method comprising:
   distinguishing at least a portion of received sound as speech by a speaker from noise;
   identifying the speaker by comparing the received speech with previously stored speech in a data storage to obtain an identification of the speaker;
   based on the identification of the speaker, searching images stored in the data storage for a stored image associated with the identified speaker;
   searching for a position of the identified speaker through a camera by comparing the stored image of the identified speaker with image data received through the camera;
   recognizing the position of the identified speaker; and
   performing microphone beamforming according to the position of the identified speaker.

2. The method of claim 1, further comprising:
   receiving a speech signal corresponding to the speech by the speaker;
   extracting a section including a predetermined speech signal from the received speech signal; and
   identifying the speaker based on the section.

3. The method of claim 2, wherein identifying the speaker comprises identifying the speaker by comparing the predetermined speech signal with speech signals that are previously acquired from one or more speakers and stored.

4. The method of claim 1, wherein searching for a position of the identified speaker comprises extracting an object corresponding to the identified speaker from the image data received through the camera by comparing the image data received through the camera with previously stored image data associated with one or more speakers.

5. The method of claim 4, wherein recognizing the position of the identified speaker comprises determining whether the position of the identified speaker is changed to a changed position based on information about the object, and wherein performing microphone beamforming comprises adaptively performing the microphone beamforming according to the changed position if the position of the identified speaker is changed to the changed position.

6. The method of claim 1, wherein performing microphone beamforming comprises amplifying a signal corresponding to sound generated from the position of the identified speaker and attenuating signals corresponding to sound generated from other positions.

7. An apparatus for performing microphone beamforming, the apparatus comprising:
   data storage configured to store images associated with speakers;
   a microphone array configured to receive sound;
   a camera configured to acquire image data;
   a processor configured to
      distinguish at least a portion of the received sound as speech by a speaker from noise,
      identify the speaker by comparing the received speech with previously stored speech in the data storage to obtain an identification of the speaker,
      based on the identification of the speaker, search the images stored in the data storage for a stored image associated with the identified speaker,
      search for a position of the identified speaker through the camera by comparing the stored image of the identified speaker with image data received through the camera, and
      recognize the position of the identified speaker; and
   a beamforming controller configured to perform microphone beamforming according to the position of the identified speaker.

8. The apparatus of claim 7, wherein the processor is configured to:
   receive a speech signal corresponding to the speech by the speaker,
   extract a section including a predetermined speech signal from the speech signal, and
   identify the speaker based on the section.

9. The apparatus of claim 8, wherein the processor is configured to identify the speaker by comparing the predetermined speech signal with speech signals that are previously acquired from one or more speakers and stored.

10. The apparatus of claim 7, wherein the processor is configured to extract an object corresponding to the identified speaker from the image data received through the camera by comparing the image data received through the camera with previously stored image data associated with one or more speakers.

11. The apparatus of claim 10, wherein the processor is configured to determine whether the position of the identified speaker is changed to a changed position based on the image acquired through the camera, and wherein the beamforming controller is configured to adaptively perform microphone beamforming according to the changed position.

12. The apparatus of claim 7, wherein the beamforming controller is configured to amplify a signal corresponding to sound generated from the position of the identified speaker and to attenuate signals corresponding to sound generated from other positions.

13. The apparatus of claim 7, wherein the processor is configured to search for the stored image of the identified speaker in a database in the apparatus.

14. The apparatus of claim 7, wherein the processor is configured to search for the stored image of the identified speaker using a search engine on a network.

15. A non-transitory computer-readable recording medium encoded with computer-executable instructions that when executed cause a data processing system to:
- distinguish at least a portion of received sound as speech by a speaker from noise;
- identify the speaker by comparing the received speech with previously stored speech in a data storage to obtain an identification of the speaker;
- based on the identification of the speaker, search images stored in a data storage for a stored image associated with the identified speaker;
- search for a position of the identified speaker through a camera by comparing the stored image of the identified speaker with image data received through the camera;
- recognize the position of the identified speaker; and
- perform microphone beamforming according to the position of the identified speaker.

16. The computer-readable recording medium of claim 15, wherein the computer-executable instructions that when executed cause the data processing system to:
- receive a speech signal corresponding to the speech by the speaker;
- extract a section including a predetermined speech signal from the received speech signal; and
- identify the speaker based on the section.

17. The computer-readable recording medium of claim 16, wherein the computer-executable instructions that when executed cause the data processing system to identify the speaker comprise computer-executable instructions that when executed cause the data processing system to compare the predetermined speech signal with speech signals that are previously acquired from one or more speakers and stored.

18. The computer-readable recording medium of claim 15, wherein the computer-executable instructions that when executed cause the data processing system to search for the position of the identified speaker comprise computer-executable instructions that when executed cause the data processing system to extract an object corresponding to the identified speaker from the image data received through the camera by comparing the image data received through the camera with stored image data associated with one or more speakers.

19. The computer-readable recording medium of claim 18, wherein the computer-executable instructions that when executed cause the data processing system to recognize the position comprise computer-executable instructions that when executed cause the data processing system to determine whether the position of the identified speaker is changed to a changed position based on information about the object, and wherein the computer-executable instructions that when executed cause the data processing system to perform microphone beamforming comprise computer-executable instructions that when executed cause the data processing system to adaptively perform the microphone beamforming according to the changed position if the position of the identified speaker is changed to the changed position.

20. The computer-readable recording medium of claim 15, wherein the computer-executable instructions that when executed cause the data processing system to perform microphone beamforming comprise computer-executable instructions that when executed cause the data processing system to amplify a signal corresponding to sound generated from the position of the identified speaker and to attenuate signals corresponding to sound generated from other positions.

* * * * *